United States Patent [19]
Coleman et al.

[11] Patent Number: 5,503,857
[45] Date of Patent: Apr. 2, 1996

[54] POCKET POP HOUSING

[76] Inventors: Thomas J. Coleman, 89 Winding Way Rd., Bristol, Va. 24201; William K. Schlotter, IV, 175 Toluca Rd., Stafford, Va. 22554; Princess A. Coleman, 89 Winding Way Rd., Bristol, Va. 24201; Ann M. Schlotter, 175 Toluca Rd., Stafford, Va. 22554

[21] Appl. No.: 302,993

[22] Filed: Oct. 20, 1994

[51] Int. Cl.$^6$ .............................. B65D 6/00; B65D 8/00; B65D 25/28
[52] U.S. Cl. .......................... 426/110; 426/134; 426/112; 426/115; 401/59
[58] Field of Search .................................. 426/112, 134, 426/115, 110; 401/59, 60; 15/185; 30/153, 151

[56] References Cited

U.S. PATENT DOCUMENTS

| | | | |
|---|---|---|---|
| 841,453 | 1/1907 | Rynehart | 15/185 |
| 1,063,411 | 6/1913 | Brupbacher | 15/185 |
| 1,104,365 | 7/1914 | Loughlin | 15/185 |
| 1,486,445 | 3/1924 | Mayol | 426/115 |
| 1,665,955 | 4/1928 | Gatewood | 15/185 |
| 2,057,720 | 10/1936 | Kasdan et al. | 15/185 |
| 2,096,611 | 10/1937 | Ellestad | 426/110 |
| 2,112,143 | 3/1938 | Costa et al. | 426/115 |
| 2,243,375 | 5/1941 | Ellestad | 426/110 |
| 2,418,510 | 4/1947 | Grogan | 15/185 |
| 2,570,412 | 10/1951 | Vogel | 15/185 |
| 2,766,123 | 10/1956 | Moubayed | 426/134 |
| 2,820,291 | 1/1958 | Philippar | 30/153 |
| 2,980,039 | 4/1961 | Jolly | 426/134 |
| 4,350,712 | 9/1982 | Kocharian et al. | 426/110 |

FOREIGN PATENT DOCUMENTS

| | | | |
|---|---|---|---|
| 2554036 | 5/1985 | France | 30/153 |
| 558243 | 2/1957 | Italy | 15/185 |
| 9408 | of 1898 | United Kingdom | 30/153 |
| 2093433 | 9/1982 | United Kingdom | 426/134 |

OTHER PUBLICATIONS

Topps Co. Brochure Dec. 1993 "Push Pop Candy".
Packaging Mar. 1994 p. 66.

*Primary Examiner*—Steven Weinstein
*Attorney, Agent, or Firm*—Melvin L. Crane

[57] ABSTRACT

A candy holding device which is used to hold a piece of candy such as a sucker in a covering to protect the candy from dirt, etc. The cover is formed in two halves which in a folded condition encloses the candy. The two halves of the cover are connected at one end on swivel drums so that in use, the half covers are pulled apart and rotated from an upper position to a lower position. As the two half covers are rotated to the lower position the two halves are rotated about the swivel drums 180 degrees so that the two halves can be secured together to form a handle. In order to protect any candy that is left, the handles are moved upwardly and rotated 180 degrees to enclose the candy within the two half covers.

1 Claim, 3 Drawing Sheets

POCKET POP HOUSING

This invention is directed to a retainer for a sucker and more particularly to a pocket retainer for an unfinished sucker to provide a clean holder and storage retainer for the sucker.

Heretofore holders for such things as pocket combs, keys, smoking pipes, cigarettes, false teeth and eating utensils have been used for carrying such items in ones pocket.

It is an object of the present invention to provide a retainer for a sucker which can be carried in ones pocket without soiling the sucker.

Another object is to provide a retainer for a sucker which also functions as a handle during consumption of the sucker.

Yet another object is to provide a retainer for carrying a sucker in a sanitary manner for later use as well as to provide a handle during consumption of the sucker and then for restoring the partially consumed sucker for later use and without soiling the sucker by putting the sucker and retainer in ones pocket.

The objects are carried out by a retainer which has a covering with an upper end the shape of a round sucker and a housing which functions as a handle. The handle is secured to a base by use of a swivel drum about which a coupling rotates and to which the handles are secured for a pivot motion. The handles in a closed position will store a sucker with the candy portion in a round covering with the handle extending downwardly along the housing. For consumption of the candy, the housing is separated, and to expose the candy sucker the handles are swung outwardly and downwardly and pivoted on the swivel so that the handles can be secured together such as they were in the upper position. Therefore the candy is exposed, the sucker stem or stick is secured in the base and the housing functions as a handle. If any candy remains, the handles can be separated and rotated upwardly and toward each other so that the handles can be closed about the remaining candy. The retainer can then be placed in ones pocket, purse or any suitable carrier without soiling the sucker retained in the retainer.

DETAILED DESCRIPTION

Figure 1:
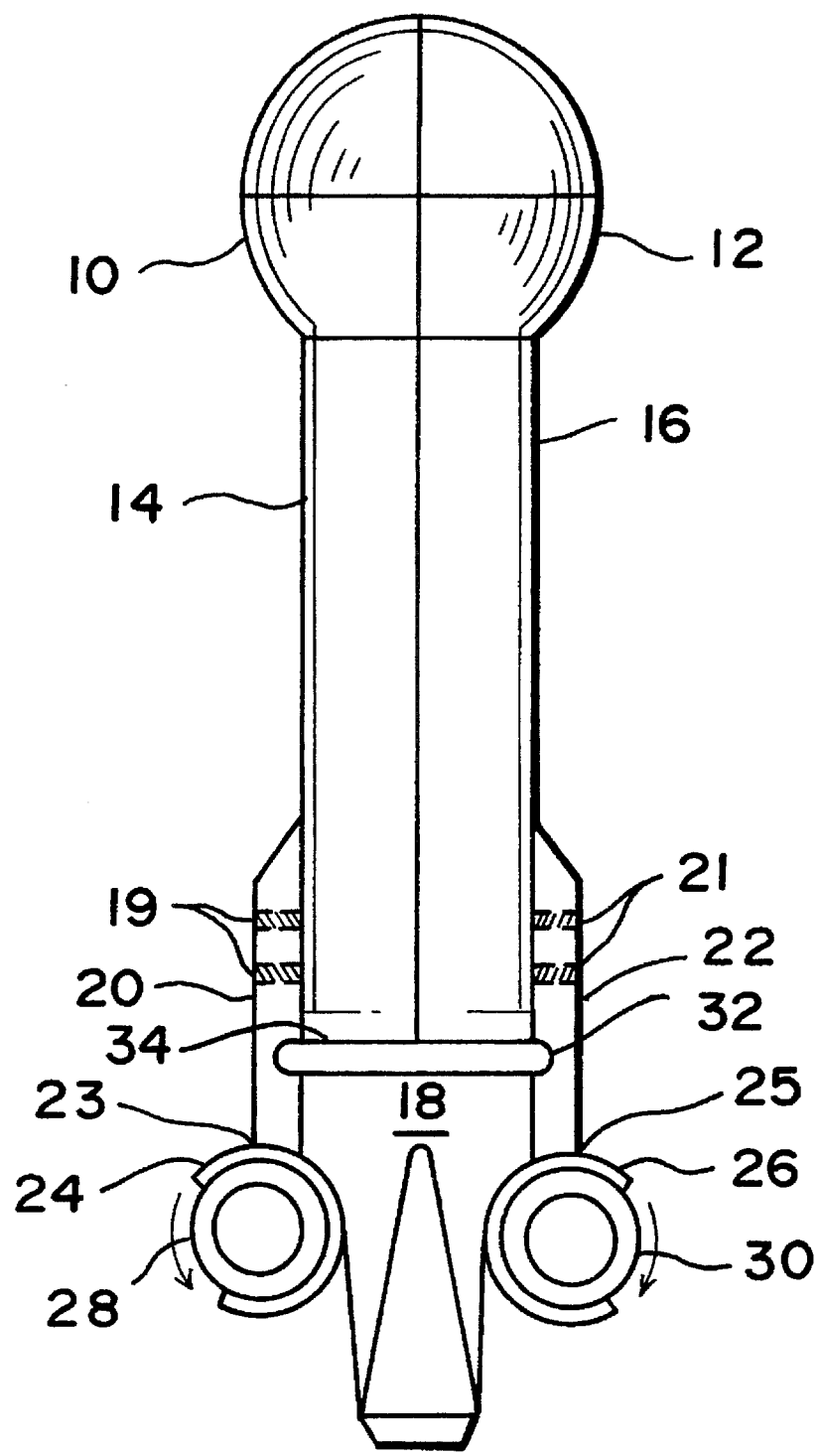
FIG. 1 illustrates a retainer for a round candy sucker or pop.
Figure 2:
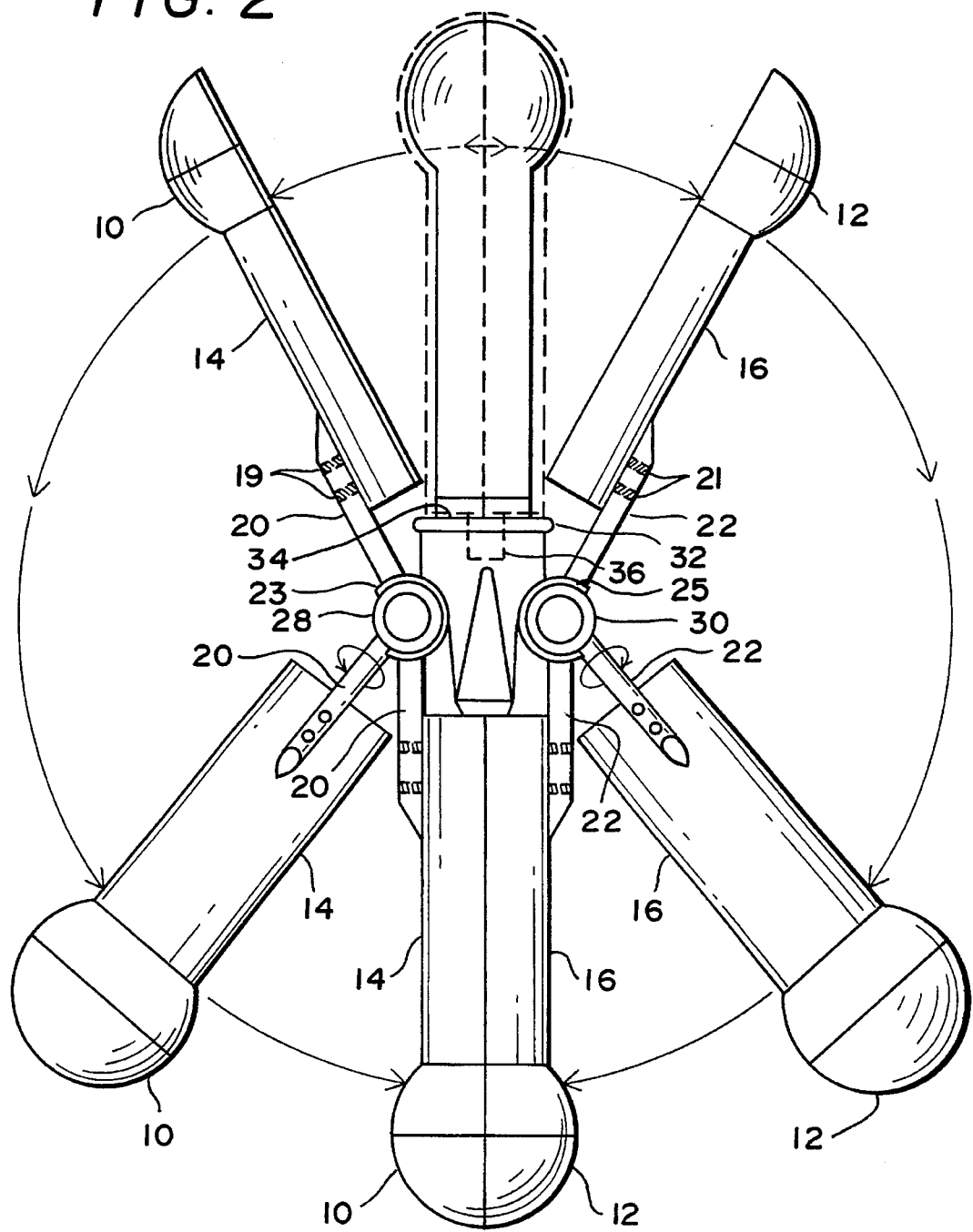
FIG. 2 is a cross sectional view which illustrates the related parts.
Figure 3:
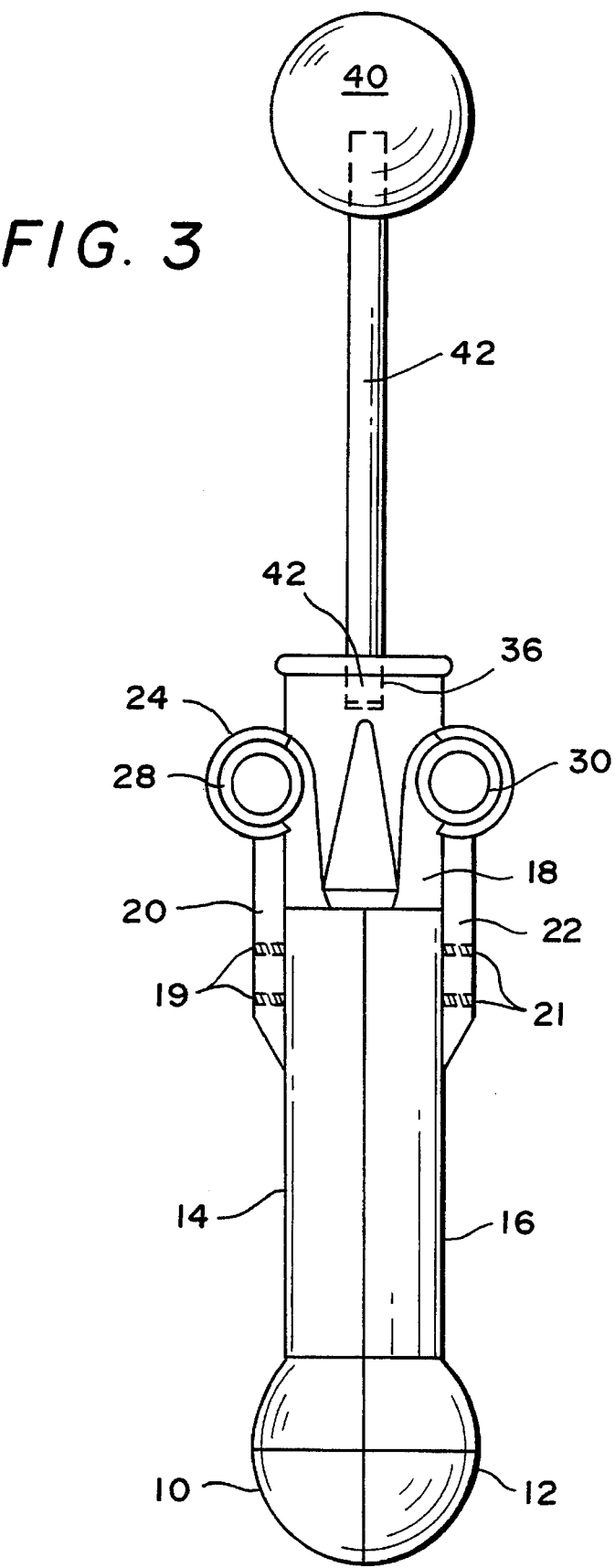
FIG. 3 illustrates the retainer in an open position by which a candy sucker can be consumed, which also illustrates the process of opening the retainer by which the handle is formed.

Now reference to the drawing there is shown in FIG. 1 a candy sucker retainer shown in a closed position for reception of a sucker by which the sucker is protected by the housing. The housing can be made of any suitable material, preferrably plastic which is easy to keep clean and will not rust. As shown, the retainer includes an upper rounded end which is suitable for retaining a rounded sucker or pop. The upper rounded end is formed by two somewhat semi-spherical shells 10, 12 which are provided with downwardly extending semi-cylindrical handles 14, 16 each of which are secured to a base 18 by use of a rod 20, 22 and securing pins 19 and 21. At pivot points 23 and 25 the rods are pivotably secured to a coupling 24, 26 which is coupled to a swivel drum 28, 30 for rotation about the drum. The base is provided with a seating ring 32 which has a shoulder 34 along which the lower end of the semi-cylindrical handles seat with a tight fit. The semi-cylindrical handles are shown secured to the rods by use of screws or some such securing pin. It would be obvious to one skilled in the art that instead of the rods pivoting about the coupling the semi-cylindrical handles could pivot about the upper end of the rod.

In carrying out the retainer for use, the base is provided with a centrally located aperture 36 shown in dotted lines in which the sucker stick is held in place. Therefore the sucker will be positively held in the retainer during storage and during consumption. In order to store the sucker the handle halves are opened and the sucker stick is inserted into the aperture 36 in the base. The sucker end will fit into the semi-spherical halves when they are closed to retain the sucker. When one desires to eat the sucker, the handle halves are pulled apart thereby exposing the sucker. The handle halves are rotated on the swivel drums in a downward motion and rotated 180 degrees during the downward movement so that the handle halves can again be secured together to form a round handle composed of the two semi-cylindrical and semi-spherical halves. If one does not eat the entire sucker and it is desired to retain the sucker for a later time, the handle halves are pulled apart and rotated on the swivel drums to an up position and the handle halves are swiveled 180 degrees and then closed about the sucker. The handle halves will then protect the remaining portion of the sucker and the retainer can be placed in ones pocket purse or wherever for future storage until further consumption of the sucker is desired.

It would be obvious to one skilled in the art that the pocket pop housing could be used for storing loose candy pieces to protect the candy and to prevent soiling the candy.

The covering piecies have been set forth as having semi-spherical ends with semi-cylindrical portions. It would be obvious that the storage housing could be made with square or any other shaped storage compartments within the scope of the invention.

We claim:

1. A protective housing assembly for a piece of candy comprising a base, a protective housing secured to said base and a piece of candy secured to a stick with the stick secured to the base, said housing comprising two elongated symmetrical sections with each section being separately secured to the base, each section comprises both an elongated semi-cylindrical portion, having a concave inner surface, which extends outwardly from said base and a substantially semi-spherical portion, also having a concave inner surface, which extends outwardly from said semi-cylindrical portion, said assembly further comprising separate means to secure each of said elongated housing sections to said base, said separate means to secure each of said elongated housing sections to said base each comprising means to pivot said respective elongated housing section about said base from a first, closed position, wherein the elongated housing sections are in contact with each other with said concave inner surfaces facing each other such that the semi-spherical portions enclose said candy and said semi-cylindrical portions enclose said stick, to a second, handle position, 180 degrees from said first, closed position wherein the elongated housing sections are again in contact with each other to expose said candy for consumption and allow the contacted elongated housing sections to be grasped as a handle, each of said separate means to secure each of said housing sections to said base further comprising means to rotate a respective elongated housing section about the longitudinal axis of said housing section such that when said elongated housing sections are moved back and forth between said first and second positions, said elongated housing sections are rotatable axially such that the inner concave surfaces of each of said housing sections face each other in said first and second positions.

* * * * *